United States Patent
Roberts et al.

(10) Patent No.: US 10,890,885 B2
(45) Date of Patent: Jan. 12, 2021

(54) MANAGING POWER OF AERIAL VEHICLES

(71) Applicant: LOON LLC, Mountain View, CA (US)

(72) Inventors: Jacob B. Roberts, San Francisco, CA (US); Salvatore J. Candido, Mountain View, CA (US)

(73) Assignee: LOON LLC, Mountain View, CA (US)

( * ) Notice: Subject to any disclaimer, the term of this patent is extended or adjusted under 35 U.S.C. 154(b) by 432 days.

(21) Appl. No.: 15/850,737

(22) Filed: Dec. 21, 2017

(65) Prior Publication Data

US 2019/0196423 A1    Jun. 27, 2019

(51) Int. Cl.
*G05B 15/02* (2006.01)
*B64D 31/00* (2006.01)

(52) U.S. Cl.
CPC ............ *G05B 15/02* (2013.01); *B64D 31/00* (2013.01); *B64D 2221/00* (2013.01)

(58) Field of Classification Search
CPC .... G05B 15/02; B64D 31/00; B64D 2221/00; B64D 41/00; B64D 2211/00; B64C 2201/06; B64C 2201/042; B64C 39/024; B64C 2201/022; B64B 1/62
See application file for complete search history.

(56) References Cited

U.S. PATENT DOCUMENTS

| | | | |
|---|---|---|---|
| 5,628,941 A | 5/1997 | Kalt et al. | |
| 7,203,491 B2 | 4/2007 | Knoblach et al. | |
| 7,356,390 B2 | 4/2008 | Knoblach et al. | |
| 7,469,857 B2 | 12/2008 | Voss | |
| 7,801,522 B2 | 9/2010 | Knoblach et al. | |
| 8,820,678 B2 | 9/2014 | DeVaul et al. | |
| 8,825,232 B2 | 9/2014 | Knoblach et al. | |
| 8,967,533 B2 | 3/2015 | DeVaul et al. | |
| 9,139,279 B2 | 9/2015 | Heppe | |
| 9,296,461 B1 | 3/2016 | Roach | |
| 9,329,600 B2 | 5/2016 | DeVaul et al. | |
| 9,409,646 B2 | 8/2016 | Fleck | |
| 9,418,243 B2 | 8/2016 | Bauer et al. | |
| 9,419,902 B1 | 8/2016 | Sites | |
| 9,420,023 B2 | 8/2016 | Ramamurthy et al. | |
| 9,519,045 B2 | 12/2016 | Knoblach et al. | |
| 9,632,503 B2 | 4/2017 | Knoblach et al. | |
| 9,836,063 B1 | 12/2017 | Bonawitz et al. | |
| 2010/0230968 A1 | 9/2010 | Chernyshov | |

FOREIGN PATENT DOCUMENTS

WO    2017/213706 A1    12/2017

*Primary Examiner* — Carlos R Ortiz Rodriguez
(74) *Attorney, Agent, or Firm* — Marton Ribera Schumann & Chang LLP; Chien-Ju Alice Chuang; Hector J. Ribera

(57) ABSTRACT

Systems and methods for managing power of an aerial vehicle, an illustrative system including an aerial vehicle including a power storage module and a plurality of components, and a computing device communicatively coupled to the aerial vehicle, the computing device including a processor and a memory storing instructions which, when executed by the processor, cause the computing device to receive data indicating a state of charge of the power storage module, receive data indicating a rate of power consumption of the plurality of components, receive a goal, generate, based on at least one of the state of charge of the power storage module, the rate of power consumption of the plurality of components, and the goal, a power command, and transmit the power command to the aerial vehicle.

20 Claims, 8 Drawing Sheets

MANAGING POWER OF AERIAL VEHICLES

BACKGROUND

Some aerial vehicles are equipped with power-generating equipment, such as solar panels, to provide power to other aerial vehicle equipment, which may be included within or otherwise coupled to the aerial vehicles. Excess power may be stored in a power storage module, such as a battery, to provide power to the aerial vehicle equipment during times when the solar panels are not generating power. However, the power storage module may not be able to store enough power to maintain full functioning of all the aerial vehicle equipment during times when the solar panels are not generating power. As such, advancements in aerial vehicle power management could be beneficial in improving power efficiency and ensuring continuity of operations.

SUMMARY

In one aspect, this disclosure describes a system for managing power of an aerial vehicle. The system includes an aerial vehicle including a power storage module and a plurality of components, and a computing device communicatively coupled to the aerial vehicle, the computing device including a processor and a memory storing instructions which, when executed by the processor, cause the computing device to receive data indicating a state of charge of the power storage module, receive data indicating a rate of power consumption of the plurality of components, receive a goal, generate, based on at least one of the state of charge of the power storage module, the rate of power consumption of the plurality of components, and the goal, a power command, and transmit the power command to the aerial vehicle.

In embodiments, the instructions, when executed by the processor, further cause the computing device to determine an expected amount of power required to satisfy the goal, and the generation of the power command is further based on the determined amount of power required to satisfy the goal.

In embodiments, the determination of the expected amount of power required to satisfy the goal is based at least in part on the data indicating the rate of power consumption of the plurality of components.

In embodiments, the plurality of components includes at least one flight-related component and at least one non-flight-related component, and the instructions, when executed by the processor, further cause the computing device to receive a location of the aerial vehicle, determine a time until sunrise based on the location of the aerial vehicle, and determine, based on the data indicating the current rate of power consumption of the plurality of components, an expected amount of power required to provide power to the at least one flight-related component until sunrise.

In embodiments, the instructions, when executed by the processor, further cause the computing device to determine, based on the data indicating the state of charge of the power storage module and the expected amount of power required to provide power to the at least one flight-related component until sunrise, that the state of charge of the power storage module is greater than the expected amount of power required to provide power to the at least one flight-related component until sunrise.

In embodiments, the instructions, when executed by the processor, further cause the computing device to determine an expected amount of allocable power, the expected amount of allocable power corresponding to a difference between the state of charge of the power storage module and the expected amount of power required to provide power to the at least one component until sunrise.

In embodiments, the instructions, when executed by the processor, further cause the computing device to generate a power allocation plan based on the expected amount of allocable power and the goal.

In embodiments, the power allocation allocates all of the allocable power to the at least one non-flight-related component based on the goal.

In embodiments, the instructions, when executed by the processor, further causes the computing device to generate a power allocation plan based on the goal.

In embodiments, the generation of the power command is further based on the power allocation plan.

In embodiments, the power allocation plan includes a plurality of power commands to switch particular components of the plurality of components to a power-saving state.

In embodiments, the plurality of power commands included in the power allocation plan are transmitted to the aerial vehicle at particular times.

In embodiments, the plurality of power commands included in the power allocation plan are transmitted to the aerial vehicle based on the state of charge of the power storage module.

In embodiments, the plurality of components includes at least one flight-related component and at least one non-flight-related component, and the power allocation plan includes at least one command to switch the at least one non-flight-related component to a power-saving state.

In embodiments, the instructions, when executed by the processor, further cause the computing device to generate at least one simulation model of power consumption of the plurality of components based on the data indicating the rate of power consumption of the plurality of components.

In embodiments, the generation of the power command is further based on the at least one simulation model.

In embodiments, the instructions, when executed by the processor, further cause the computing device to generate a power allocation plan based on the goal and the simulation model.

In embodiments, the power allocation plan includes a command to switch at least one of the plurality of components to a power-saving state.

In one aspect, this disclosure describes a method for managing power of an aerial vehicle. The method includes receiving data indicating a state of charge of a power storage module of the aerial vehicle, receiving data indicating a rate of power consumption of a plurality of components of the aerial vehicle, receiving a goal, generating, based on at least one of the state of charge of the power storage module, the rate of power consumption of the plurality of components, and the goal, a power command, and transmitting the power command to the aerial vehicle.

In one aspect, this disclosure describes a non-transitory computer-readable storage medium storing instructions which, when executed by a processor, cause a computing device to receive data indicating a state of charge of a power storage module of an aerial vehicle, receive data indicating a rate of power consumption of at least one component of the aerial vehicle, receive a goal, generate, based on at least one of the state of charge of the power storage module, the rate of power consumption of the plurality of components, and the goal, a power command, and transmit the power command to the aerial vehicle.

BRIEF DESCRIPTION OF THE DRAWINGS

Various aspects and features of the present systems and methods for controlling an aerial vehicle are described herein below with reference to the drawings, wherein.

DETAILED DESCRIPTION

Figure 1:
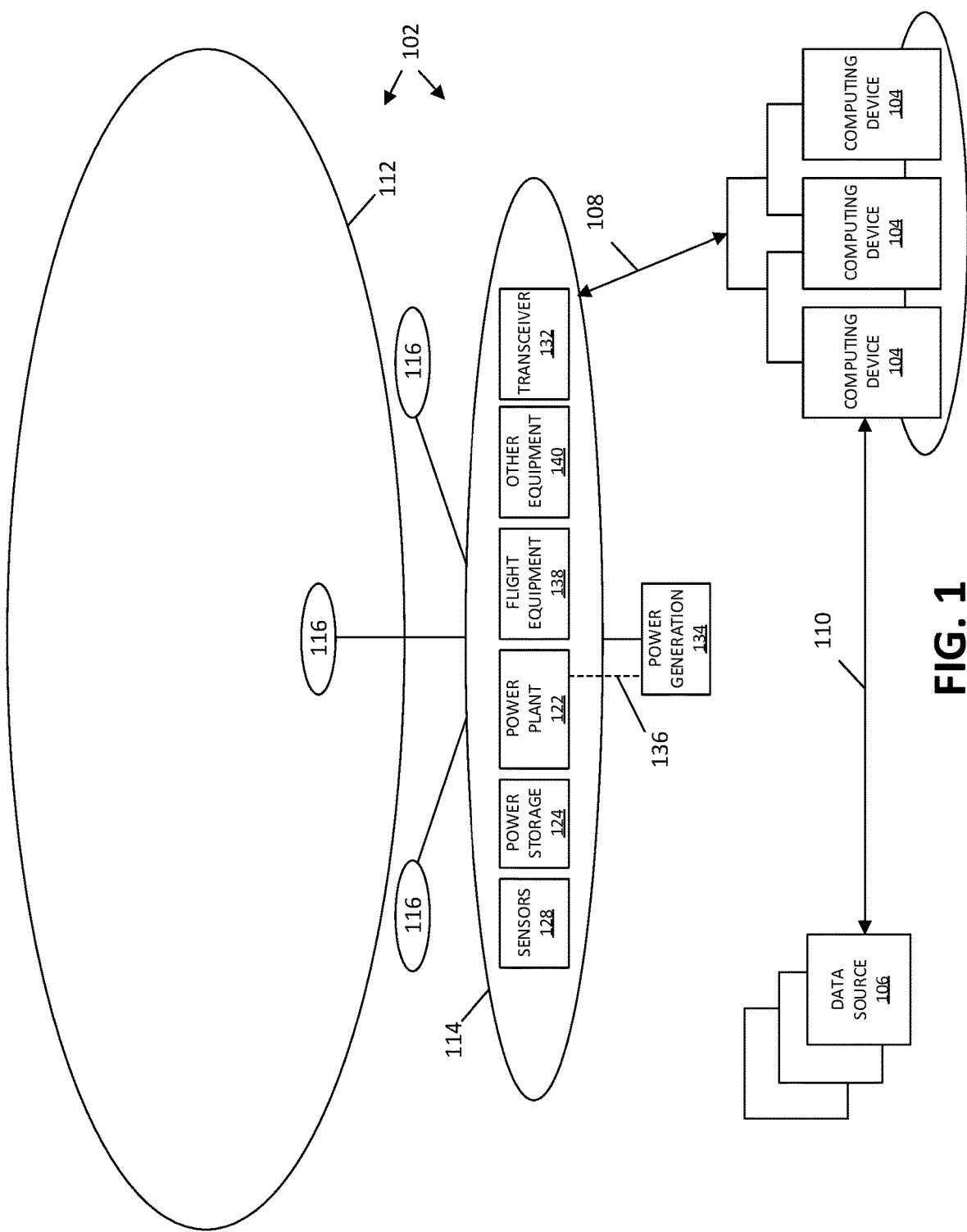
FIG. 1 is a schematic diagram of an illustrative aerial vehicle system, in accordance with an embodiment of the present disclosure.

The present disclosure generally relates to managing power of aerial vehicles, and, more specifically, to systems and methods for estimating power needs of equipment of aerial vehicles, which may be included within the aerial vehicles and/or coupled to the aerial vehicles, and managing power consumption of such equipment. In one aspect, the systems and methods of the present disclosure enable a computing device to receive data regarding power usage of equipment coupled to one or more aerial vehicles, determine whether sufficient power is available to provide power to all or a subset the equipment coupled to the aerial vehicles, and generate a power allocation plan or budget to selectively provide power to at least a portion of the equipment. The systems and methods of the present disclosure, in some aspects, enable a control system of an aerial vehicle to determine, based on the power allocation plan and/or specific power allocation commands, whether the aerial vehicle is able to provide power to particular equipment. The control system of the aerial vehicle may further, in a case where it is determined that the aerial vehicle does not have enough power to maintain flight until the aerial vehicle is again able to generate power, perform a controlled descent before power is depleted.

Although the term "power" is used throughout the present disclosure, generally to refer to electric power, one of skill in the art would appreciate that the present disclosure has similar applicability to other types of physical quantities, such as electrical energy, charge, current, voltage, and/or the like. Those skilled in the art will appreciate that, while the present disclosure uses power as an illustrative example, the same or similar systems and processes as those described herein may also be applied to manage usage of various other types and/or forms of physical quantities without departing from the scope of the present disclosure. Additionally, the present disclosure is not limited to any particular units of measurement for the physical quantities described. For instance, although power may be measured in watts (W); electric energy may be measured in joules (J), kilowatt-hours (kW-h), or electronvolts (eV); electric charge may be measured in coulombs (C); electrical current may be measured in amps (A); and voltage may be measured in volts (V), other types of units of measurement are also contemplated within the scope of the present disclosure, as one of skill in the art would appreciate.

As such, the systems and processes for managing power usage described below may be applied to various devices. In particular, any device whose operation is dependent upon a limited resource may benefit from the systems and processes for managing power usage described below. For example, any device that is coupled to an intermittent power source, such as a solar power generating component, may benefit from the below-described systems and processes. An illustrative device used as an example hereinbelow is an unmanned aerial vehicle. While various types and forms of aerial vehicles are envisioned by the present disclosure, including balloons, airships, other vehicles that maintain altitude at least in part by using buoyancy, and/or the like, the present disclosure will use a superpressure balloon as an illustrative aerial vehicle. Superpressure balloons are designed to float at an altitude in the atmosphere where the density of the balloon system is equal to the density of the atmosphere. The altitude of a superpressure balloon is controlled by an altitude control system, which, when in use, may be one of the components of the aerial vehicle that consume the most power.

With reference to FIG. 1, an illustrative aerial vehicle control system 100 includes an aerial vehicle 102, one or more computing devices 104, and one or more data sources 106, not drawn to scale. The aerial vehicle 102 and the computing devices 104 are communicatively coupled to one another by way of a wireless communication link 108, and the computing devices 104 and the data sources 106 are communicatively coupled to one another by way of a wired and/or wireless communication link 110. In some aspects, the aerial vehicle 102 is configured to be launched into and moved about the atmosphere, and the computing devices 104 cooperate as a ground-based distributed array to perform their functions described hereinbelow. The data sources 106 may include airborne data sources, such as airborne weather balloons, additional airborne aerial vehicles 102, and/or the like, and/or ground-based data sources, such as publicly available and/or proprietary datasets, examples of which are the Global Forecast System (GFS) operated by the National Oceanic and Atmospheric Administration (NOAA), as well as datasets maintained by the European Center for Medium-range Weather Forecasts (ECMWF). Although the present disclosure is provided in the context of an embodiment where the system 100 includes multiple computing devices 104 and multiple data sources 106, in other embodiments the system 100 may include a single computing device 104 and a single data source 106. Further, although FIG. 1 shows a single aerial vehicle 102, in various embodiments the system 100 includes a fleet of multiple aerial vehicles 102 that are positioned at different locations throughout the atmosphere and that are configured to communicate with the computing devices 104, the data sources 106, and/or one another by way of the communication links 108 and/or 110.

In various embodiments, the aerial vehicle 102 may be configured to perform a variety of functions or provide a variety of services, such as, for instance, telecommunication services (e.g., long term evolution (LTE) service), hurricane monitoring services, ship tracking services, services relating to imaging, astronomy, radar, ecology, conservation, and/or other types of functions or services. Computing devices 104 generate and provide commands to the aerial vehicles 102 to control the position (also referred to as location) and/or movement of the aerial vehicles 102 throughout the atmosphere or beyond, and monitor and control the power generation and usage of the equipment coupled to the aerial vehicles 102 to facilitate effective and efficient performance of their functions or provision of their services, as the case may be. As described in further detail hereinbelow, the computing devices 104 are configured to obtain a variety of types of data from a variety of sources and, based on the obtained data, generate and provide various commands to the aerial vehicles 102 to control its position and/or movement during flight, as well as monitor and control the allocation and provision of power to various equipment coupled to the aerial vehicles 102.

With continued reference to FIG. 1, an illustrative aerial vehicle 102 includes a lift gas balloon 112, one or more ballonets 116, and a payload or gondola 114, which is suspended beneath the lift gas balloon 112 and/or one or more ballonets 116 while the aerial vehicle 102 is in flight. The ballonets 116 are used to control the buoyancy, and thereby the altitude, of the aerial vehicle 102 during flight. In some aspects, the ballonets 116 include air and the lift gas balloon 112 includes a lifting gas, such as helium, that is lighter than air. As shown in FIG. 1, the ballonets 116 may be positioned inside the lift gas balloon 112 and/or outside the lift gas balloon 112. An altitude controller (which is a component of flight-related equipment 138) controls a pump and a valve (neither of which are shown in FIG. 1) to pump air into the ballonets 116 (from air outside the aerial vehicle 102) to increase the mass of the aerial vehicle 102 and lower its altitude, or to release air from the ballonets 116 (into the atmosphere outside the aerial vehicle 102) to decrease the mass of the aerial vehicle 102 and increase its altitude. The combination of the altitude controller, the lift gas balloon 112, the ballonets 116, and the valves and pumps (not shown in FIG. 1) may be referred to as an air-gas altitude control system (ACS).

The gondola 114 includes a variety of components, some of which may or may not be included, depending upon the application and/or needs of a particular aerial vehicle 102 and/or a particular flight. Although not expressly shown in FIG. 1, the various components of the aerial vehicle 102 in general, and/or of the gondola 114 in particular, may be coupled to one another for communication of power, data, and/or other signals or information. The example gondola 114 shown in FIG. 1 includes a power plant 122, a power storage module 124, one or more sensors 128, a transceiver 132, one or more power generation modules 134, flight-related equipment 138, and other non-flight-related equipment 140. The transceiver 132 is configured to wirelessly communicate data between the aerial vehicle 102 and the computing devices 104 and/or data sources 106 by way of the wireless communication link 108 and/or the communication link 110, respectively. In some embodiments, the transceiver 132 is configured to communicate data between the aerial vehicle 102 and the computing devices 104 and/or the data sources 106 by way of satellite communications. In such embodiments, the wireless communication link 108 may include one or more satellite communication links (not shown in FIG. 1). In an embodiment, the power generation module 134 includes one or more solar panels configured to absorb sunlight, when available, and generate power, such as electrical energy, from the absorbed sunlight. The power is provided, by way of power paths such as power path 136, to power plant 122, which controls the distribution of power to the various components of the aerial vehicle 102, as further described below. As shown in FIG. 1, the power generation module 134 may be affixed to and/or suspended below the gondola 114. Alternatively, or in addition, the power generation module 134 may be affixed to an upper portion of the lift gas balloon 112 and/or elsewhere to aerial vehicle 102 (not shown in FIG. 1). In some embodiments, the power generation module 134 may be adjustable to be in a position that is more suitable for power generation. For example, solar panels may be adjusted to face the direction of the sun, and may be intermittently readjusted to track the movement of the sun throughout the day.

In some embodiments, the sensors 128 include a global positioning system (GPS) sensor that senses and outputs location data, such as latitude, longitude, and/or altitude data corresponding to a latitude, longitude, and/or altitude of the aerial vehicle 102 in the Earth's atmosphere. The sensors 128 are configured to provide the location data to the computing devices 104 by way of the wireless transceiver 132 and the wireless communication link 108 for use in controlling the aerial vehicle 102, as described in further detail below.

The power storage module 124 includes one or more energy accumulators, batteries, and/or other energy storage mechanisms that store excess power—or another physical quantity such as electrical charge, as described above-provided by the power generation module 134 to the power plant 122. The power stored in the power storage module 124 may later be provided to the flight-related equipment 138 and the other equipment 140 of the aerial vehicle 102 during times when the power generation module 134 are not generating power, such as during overnight hours. For example, in an embodiment where the power generation module 134 includes one or more solar panels, the power plant 122 controls the distribution of power received from the solar panels (when the solar panels generate power) and/or stored by the power storage module 124 (when the solar panels are not generating power). The power plant 122 further converts and/or conditions the power to a form suitable for use by the various components of the aerial vehicle 102. As described in further detail below, in various embodiments the power plant 122 is configured to control the provision of power to various components of the flight-related equipment 138 and the other equipment 140 based at least in part upon a power allocation budget and/or specific power commands that are generated by, and received from, the computing devices 104 by way of the wireless communication link 108 and the transceiver 132. In some examples, the power plant 122 is configured to implement the power allocation budget by allowing or prohibiting the flow of power to the various components, and/or by causing one or more components to switch to a power-saving state, based on the power allocation budget and/or the power commands.

The fight-related equipment 138 may include a variety of types of equipment used to keep the aerial vehicle 102 floating at a desired altitude. In particular, the flight-related equipment 138 includes the altitude control system; communications equipment for maintaining the wireless communications link 108; power-related equipment such as the power plant 122, power storage module 124, and the power generation module 134; and at least one heater to keep the components warm, etc. The other non-flight-related equipment 140 includes the other components used to provide various functions of the aerial vehicle 102, and may vary depending upon the application or needs of the aerial vehicle 102, as outlined herein. For example, the other equipment 140 may include service equipment, such as an LTE system including LTE transmitters and/or receivers, weather sensors, imaging equipment, and/or any other suitable type of equipment for providing a particular service or function.

Figure 2:
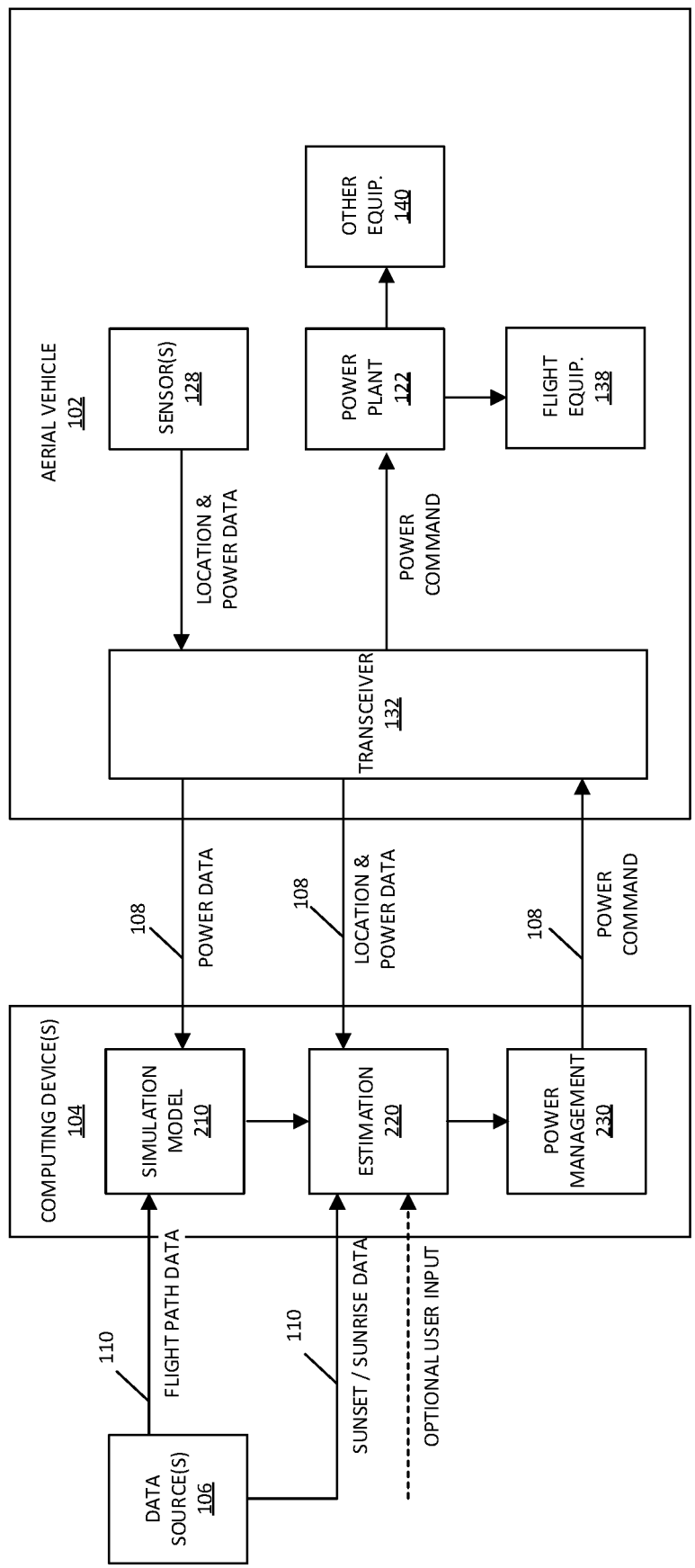
FIG. 2 is a schematic diagram showing additional aspects of the aerial vehicle system of FIG. 1, in accordance with an embodiment of the present disclosure.

Having provided an overview of the aerial vehicle control system 100 in the context of FIG. 1, reference is now made to FIG. 2, which shows certain operations of the aerial vehicle control system 100, in accordance with an embodiment of the present disclosure. In particular, FIG. 2 illustrates an example embodiment of how functionality and corresponding components are allocated among the aerial vehicle 102, the computing devices 104, and/or the data sources 106, to manage power allocation and consumption of the equipment 138, 140 coupled to the aerial vehicle 102. Although more detailed aspects of how the system 100 implements power management for the aerial vehicle 102 are provided below in the context of FIGS. 4A-4D (referred to collectively as FIG. 4), FIG. 2 provides an overview of the functionality and component allocation. The arrangement of components depicted in FIG. 2 is provided by way of example and not limitation. Other arrangements of components and allocations of functionality are contemplated, for instance, with the aerial vehicle 102 including components that implement functionality shown in FIG. 2 as being implemented by the computing devices 104, or vice versa. However, in the example shown in FIG. 2, a majority of components and functionality are allocated to the computing devices 104 instead of to the aerial vehicle 102, which decreases the amount of power required to operate the equipment 138, 140 coupled to the aerial vehicle 102, and thus enables the equipment 138, 140 to utilize a greater portion of the available power than would be possible if more components and functionality were allocated to the aerial vehicle 102. This increases the capabilities of the aerial vehicle 102 for implementing functionality and/or providing services for a given amount of available power.

In addition to certain components that were introduced above in connection with FIG. 1, FIG. 2 shows a simulation model module 210, an estimation module 220, and a power management module 230 that are included within the computing devices 104. The simulation model module 210, estimation module 220, and power management module 230 may be embodied as software modules, hardware modules, or various combinations of both. Once the aerial vehicle 102 is in flight in the atmosphere, the sensors 128 are configured to periodically transmit to the computing device 104, and particularly to the simulation model module 210 and/or the estimation module 220, by way of the transceiver 132 and the wireless communication link 108, location and/or power data, such as timestamped GPS positions and altitudes of the aerial vehicle 102 at corresponding times, and/or power consumption and storage levels. For example, the power data may include an amount of power, measured in, for example, watts (W) for power, joules (J), kilowatt-hours (kW-h), electronvolts (eV) for energy; coulomb (C) for electric charge, amps (A) for current, and/or volts (V) for voltage, being consumed by each component of the flight-related equipment 138 and the other equipment 140, and a level of stored power, also measured in for example, watts (W) for power, joules (J), kilowatt-hours (kW-h), electronvolts (eV) for energy; coulomb (C) for electric charge, amps (A) for current, and/or volts (V) for voltage, remaining in the power storage module 124. The simulation model module 210 utilizes the power data obtained from the sensors 128 and flight path data, sunset/sunrise data, and/or other data regarding the power consumption and/or efficiency of the equipment 138, 140 coupled to the aerial vehicle 102 received from other data sources 106, to generate one or more simulation models of power consumption by the various components of the equipment 138, 140 coupled to the aerial vehicle 102, as further described below. In some embodiments, the simulation models are further based on the location of the aerial vehicle 102, and/or various components of the equipment 138, 140 may have different power consumption profiles based on the location of the aerial vehicle 102. For example, the simulation models may reflect historical power consumption of the components at a particular location, as well as the geographical characteristics of the location, and/or real-time or pseudo-real-time weather data at the particular location. In particular, the simulation model module 210 may receive historical data regarding power consumption and efficiency of various components of the equipment 138, 140 coupled to the aerial vehicle 102, and generate one or more simulation models of expected power consumption by the components of the equipment 138, 140. The simulation models may further be enhanced and/or updated based on the actual power consumption data received from sensors 128. In embodiments, the simulation model module 210 may generate multiple simulation models simulating all aspects of flight of the aerial vehicle 102 that may impact power generation and/or power consumption, and may determine, based on the parameters used to generate the various simulation models, a most likely forecast of power generation and/or power consumption. For example, each simulation model generated by the simulation model module 210 may have an associated confidence interval of that simulation model being the most accurate simulation model, based on parameters used to generate the simulation model and/or the results of other simulation models.

The estimation module 220 estimates the amount of power expected to be required by each of the various components of the equipment 138, 140 over a particular time period. For example, the estimation module 220 may receive sunrise/sunset data from the other data sources 106 by way of communication link 110, and thereby determine, based on the location data received from the sensors 128 by means of the transceiver 132 and the communication link 108, the time of sunset and/or sunrise at the location of the aerial vehicle 102, as well as a time remaining until sunrise at the location of the aerial vehicle 102. The estimation module 220 may then, based on the time remaining until sunrise and the amount of power being consumed by each of the various components of the equipment 138, 140, determine the amount of power expected to be required by each of the various components (referred to hereinafter as a component's individual power requirement), as well as a total amount of power expected to be required by all of the components of the equipment 138, 140. The estimation module 220 may further receive data from the simulation model module 210, such as the one or more simulation models, and may further determine the individual and total expected power requirements based on the one or more simulation models, as further described below. In addition to determining the individual and total expected power requirements, the estimation module 220 also estimates, based on the level of stored power remaining in the power storage module 124, an amount of time remaining until the stored power remaining in the power storage module 124 will reach various thresholds, such as, for example, 50% remaining, 20% remaining, 5% remaining, 0% remaining, etc. That is, the estimation module 220 estimates the amount of time remaining during which the expected power requirements of the various components can be met.

After the estimation module 220 determines the expected power requirements of the various components and the time remaining during which the expected power requirements can be met, the power management module 230 determines which of the various components should be powered, and when, if at all, one or more of the various components should be switched to a power-saving state. The power management module 230 may then determine a power allocation plan or budget according to which power should be allocated until the next sunrise. The power allocation plan may be based on one or more goals, and may allocate power to particular components of the equipment 138, 140 based on the one or more goals. The goals may include general goals, such as, for example, allocate all available power such that the level of stored power in the power storage module 124 reaches 0% at sunrise, allocate power based on different flight modes (e.g. prioritize providing power to communications equipment when providing LTE service, prioritize providing power to navigation equipment when not providing LTE service, etc.), and/or preserve a sufficient amount of power to maintain a predetermined confidence level that the aerial vehicle will not need to enter a low-power state, etc. The goals may further include specific goals, such as, for example, preserve a particular amount of power until a particular time, preserve sufficient power to be able to provide power to particular components, allocate power to particular components based on a relative benefit of providing power to one component versus another, etc. This allows the power management module 230 to generate the power allocation plan such general goals of "spend all available power" are met, while also taking into account specific goals that may be based on expected usage or events. For example, if weather data received from the data sources 106 indicate that the ambient temperature may drop to unusually low levels overnight, additional power may have to be allocated to the heaters and/or the ACS to maintain desired flight operations. In another example, flight plan data that control flight operations of the aerial vehicle 102 may require that the ACS be activated for a particular amount of time overnight, and in that case, the power allocation plan should allocate a particular amount of power to the ACS. The power management module 230 further generates one or more power commands to be transmitted to the power plant 122 of the aerial vehicle 102 via the communication link 108 and the transceiver 132, as further described below with reference to FIGS. 4A-4D. The power commands may be based on the power allocation plan or budget, and may instruct the power plant 122 of the aerial vehicle 102 as to which of the various components may receive power at particular times, according to the power allocation plan. The power commands may be transmitted in a particular sequence and/or at particular times to correspond to the power allocation plan.

As used herein, the term "power-saving state" refers to any state or mode of operation to which a component can selectively be switched wherein the component consumes less power than the component consumes when it is operating normally and/or to its full capacity (e.g., in a non-power-saving state), and from which the component may later be restored to a normal operating state. For example, various electronic components may be switched to a different state and/or mode of operation wherein the electronic components provide less or no functionality (e.g. simply stay warm) and thus require less power.

The functionality of the simulation model module 210, the estimation module 220, and the power management module 230 is further described below with reference to FIGS. 4A-4D. With regard to the description of FIGS. 4A-4D, the simulation model module 210, the estimation module 220, and the power management module 230 may be referred to specifically or generally as components of the computing devices 104, and those skilled in the art will appreciate that the computing device 105 may perform the below-described functionality by means of these modules and/or other components not expressly described herein.

Figure 3:
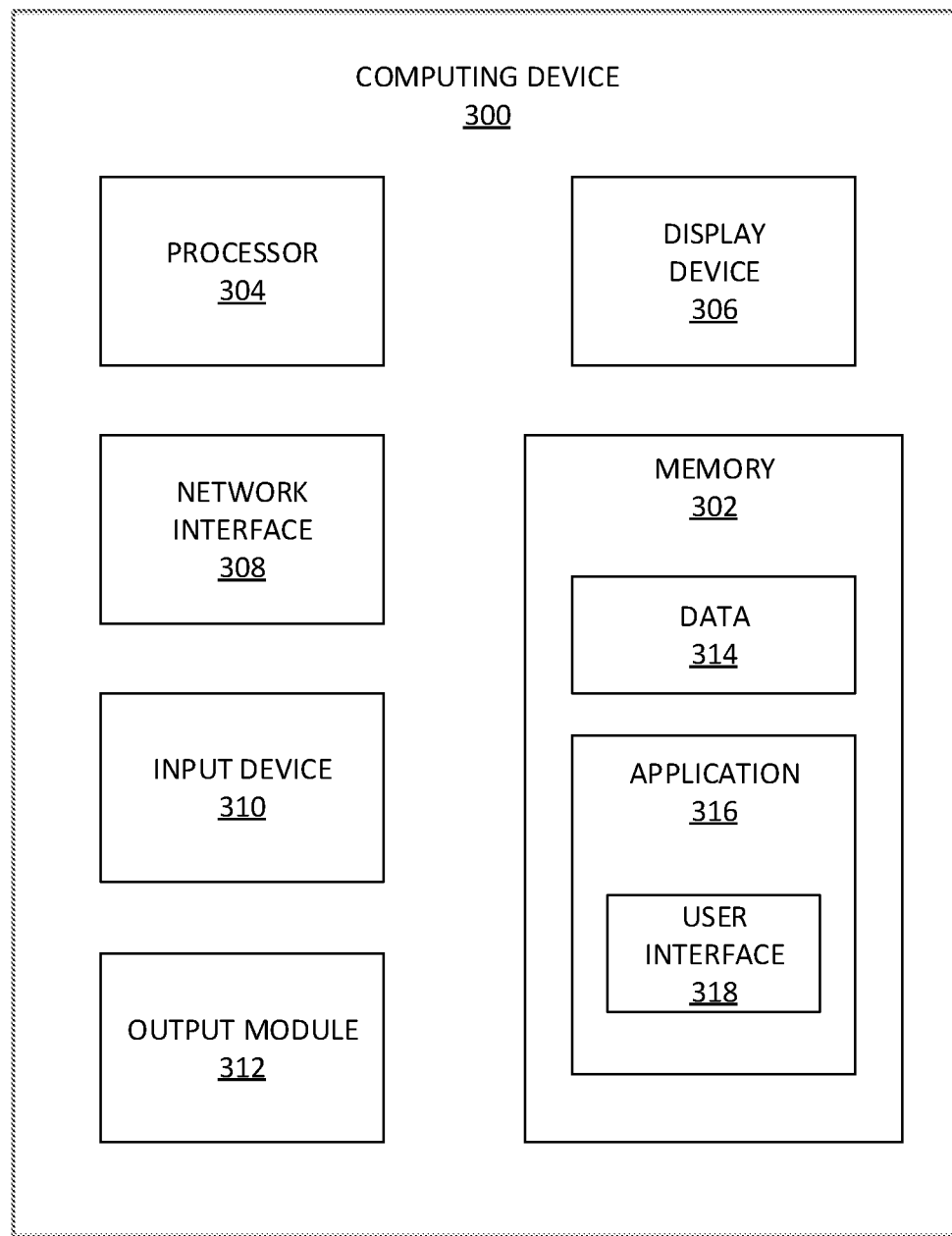
FIG. 3 is a schematic block diagram of an illustrative embodiment of a computing device that may be employed in various embodiments of the present system, for instance, as part of the system or components of FIG. 1 or 2, in accordance with an embodiment of the present disclosure.

Turning now to FIG. 3, there is shown a schematic block diagram of a computing device 300 that may be employed in accordance with various embodiments described herein. Although not explicitly shown in FIG. 1 or FIG. 2, in some embodiments, the computing device 300, or one or more of the components thereof, may further represent one or more components (e.g., the computing device 104, one or more of the components 138, 140, the data sources 106, and/or the like) of the system 100. The computing device 300 may, in various embodiments, include one or more memories 302, processors 304, display devices 306, network interfaces 308, input devices 310, and/or output modules 312. The memory 302 includes non-transitory computer-readable storage media for storing data and/or software that is executable by the processor 304 and which controls the operation of the computing device 300. In embodiments, the memory 302 may include one or more solid-state storage devices such as flash memory chips. Alternatively, or in addition to the one or more solid-state storage devices, the memory 302 may include one or more mass storage devices connected to the processor 304 through a mass storage controller (not shown in FIG. 3) and a communications bus (not shown in FIG. 3). Although the description of computer-readable media included herein refers to a solid-state storage, it should be appreciated by those skilled in the art that computer-readable storage media may be any available media that can be accessed by the processor 304. That is, computer readable storage media include non-transitory, volatile and non-volatile, removable and non-removable media implemented in any method or technology for storage of information such as computer-readable instructions, data structures, program modules or other data. Examples of computer-readable storage media include RAM, ROM, EPROM, EEPROM, flash memory or other solid-state memory technology, CD-ROM, DVD, Blu-Ray or other optical storage, magnetic cassettes, magnetic tape, magnetic disk storage or other magnetic storage devices, or any other medium which may be used to store the desired information and which can be accessed by the computing device 300.

In some embodiments, the memory 302 stores data 314 and/or an application 316. In some aspects, the application 316 includes a user interface component 318 that, when executed by the processor 304, causes the display device 306 to present a user interface, for example a graphical user interface (GUI) (not shown in FIG. 3). The network interface 308, in some embodiments, is configured to couple the computing device 300 and/or individual components thereof to a network, such as a wired network, a wireless network, a local area network (LAN), a wide area network (WAN), a wireless mobile network, a BLUETOOTH network, the Internet, and/or another type of network. The input device 310 may be any device by means of which a user may interact with the computing device 300. Examples of the input device 310 include without limitation a mouse, a keyboard, a joystick, a touch screen or pad, a voice interface, a camera, and/or the like. The output module 312 may, in various embodiments, include any connectivity port or bus, such as, for example, a parallel port, a serial port, a universal serial bus (USB), or any other similar connectivity port known to those skilled in the art.

Referring now to FIGS. 4A-4D, there is shown a flowchart depicting an illustrative method 400 for managing power of an aerial vehicle from the perspective of the computing devices 104 of the system 100, in accordance with an embodiment of the present disclosure. As described above, the computing devices 104 include various components, including processors, memories, and various other modules. As will be appreciated by those skilled in the art, the processes described below may be performed and/or executed by a variety of these components. As such, the description that follows will refer to the processes being performed by the computing devices 104, but those skilled in the art will recognize that one or more of the above-described components of the computing devices 104 are used by the computing devices 104 to perform and/or execute these processes. Further, those skilled in the art will recognize that the processes described below may be a sub-process forming part of a bigger process for controlling aerial vehicles, and thus various other processes and steps may be performed in addition to the below-described steps and processes. While the processes described below are organized into an illustrative ordered sequence of steps, those skilled in the art will appreciate that various of these steps may be performed in a different order or sequence, repeated, and/or omitted without departing from the scope of the present disclosure.

Figure 4A:
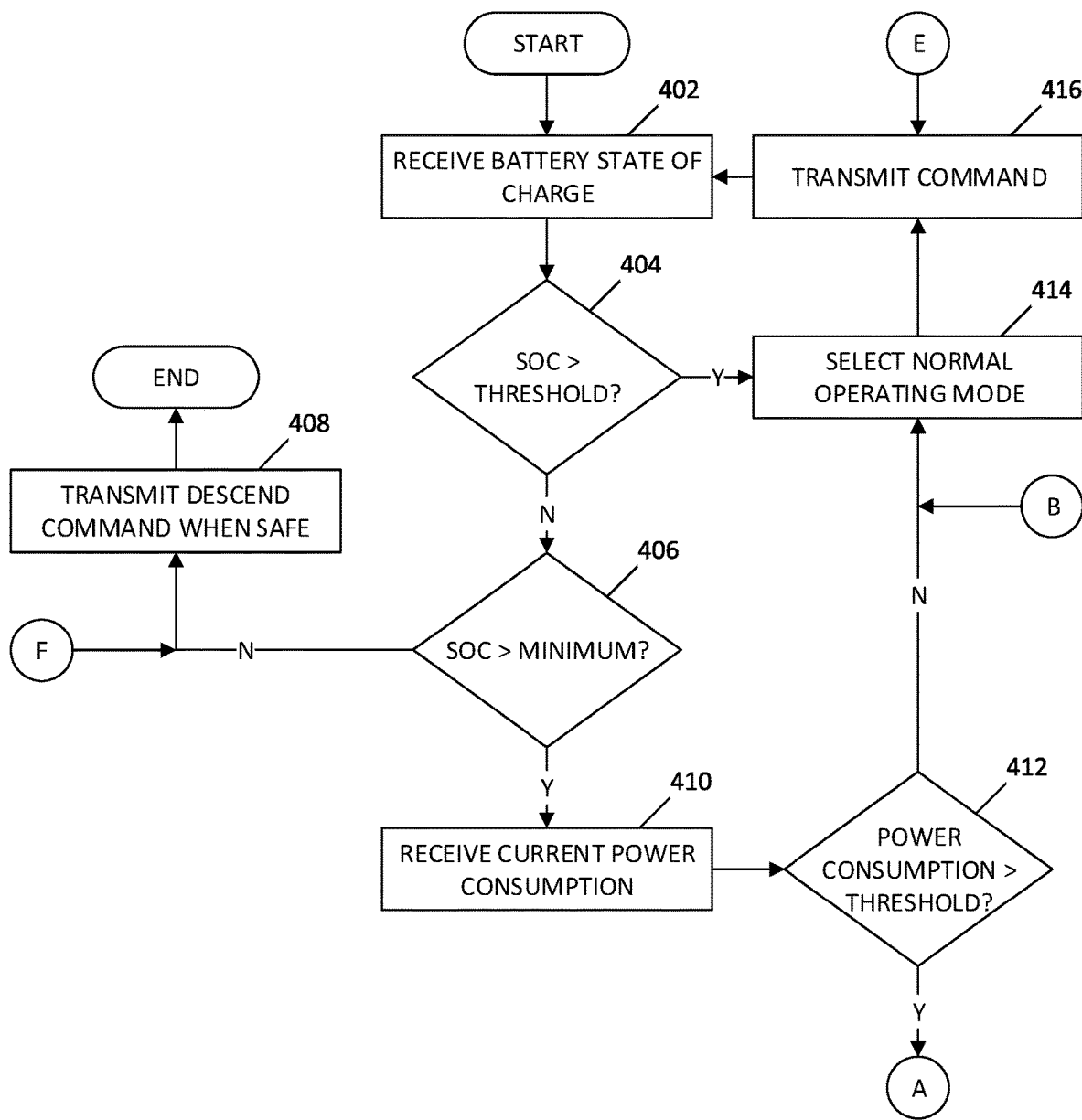
FIGS. 4A-4D (collectively, FIG. 4) depict a flowchart showing an illustrative method for managing power of an aerial vehicle from the perspective of the computing device of FIG. 1, in accordance with an embodiment of the present disclosure.

The method 400 for managing power an aerial vehicle, such as the aerial vehicle 102, may start at block 402 of FIG. 4A, where the computing devices 104 receive data regarding a state of charge (SOC) of the power storage module 124 from the aerial vehicle 102. The SOC of the power storage module 124 corresponds to the level of stored power, measured in, for example, watts (W) for power, joules (J), kilowatt-hours (kW-h), electronvolts (eV) for energy; coulomb (C) for electric charge, amps (A) for current, and/or volts (V) for voltage, stored in the power storage module 124.

Thereafter, at block 404, the computing devices 104 determine whether the SOC of the power storage module 124 received at block 402 is greater than a threshold. In embodiments, the threshold may be a predetermined safety threshold, such as a particular level of stored power above which it is not necessary to manage the power consumption of the various components of the equipment 138, 140 coupled to the aerial vehicle 102. For example, the safety threshold may be 80% of the maximum SOC of the power storage module 124. In embodiments, the safety threshold may be based on a flight plan of the aerial vehicle 102. For example, the flight plan may require that a particular amount of power be preserved for flight or service operations. In other embodiments, the threshold may be a variable threshold that is adjusted based on the time of the day, and may thus be proportional to the amount of time remaining until sunrise. If the computing devices 104 determine that the SOC of the power storage module 124 is greater than the safety threshold ("Y" at block 404), processing proceeds to block 414. Alternatively, if the computing devices 104 determine that the SOC of the power storage module 124 is not greater than the safety threshold ("N" at block 404), processing proceeds to block 406.

At block 406, the computing devices 104 determine whether the SOC of the power storage module 124 received at block 402 is greater than a critical threshold. In embodiments, the critical threshold may be a minimum level of stored power below which flight operations may be considered unsafe. For example, the critical threshold may be 5%, 2%, 1%, etc. of the maximum SOC of the power storage module 124. In some embodiments, the critical threshold may be proportional to the amount of time remaining until sunrise, and may get lower as the time remaining until sunrise decreases, such that the critical threshold is 0% at sunrise. If the computing devices 104 determine that the SOC of the power storage module 124 is not greater than the critical threshold ("N" at block 406), processing proceeds to block 408, where the computing devices 104 generate a descend command to instruct the aerial vehicle 102 to descend to the ground, and the computing devices 104 transmit the descend command to the aerial vehicle via the communication link 108 when it is determined that the aerial vehicle 102 is able to descend safely to the ground. Alternatively, if the computing devices 104 determine that the SOC of the power storage module 124 is greater than the critical threshold ("Y" at block 406), processing proceeds to block 410.

At block 410, the computing devices 104 receive data regarding a current rate of power consumption from the aerial vehicle 102. The data regarding the current rate of power consumption may include a current rate of power consumption of each of the various components of the equipment 138, 140 coupled to the aerial vehicle 102, and/or a total current rate of power consumption by all the components of the equipment 138, 140 taken together. Thereafter, at block 412, the computing devices 104 determine whether the total current rate of power consumption, that is, the sum of the current rates of power consumption of each of the various components, is greater than a power consumption threshold. For example, the power consumption threshold may correspond to a rate of power consumption that will consume over a period of 6 hours an amount of power equal to 50% of the maximum SOC of the power storage module 124. In some embodiments, the power consumption threshold may vary based on an amount of time remaining until sunrise. If the computing devices 104 determine that the total current rate of power consumption is not greater than the power consumption threshold ("N" at block 412), processing proceeds to block 414. Alternatively, if the computing devices 104 determine that the total current rate of power consumption is greater than the power consumption threshold ("Y" at block 412), processing proceeds to block 418.

At block 414, the computing devices 104 select a normal operating mode for the aerial vehicle 102. The normal operating mode allows all components of the equipment 138, 140 coupled to the aerial vehicle to be switched on and operate at their full capacity, and enables the power plant 122 to provide power to all the components. It will be appreciated by those skilled in the art that all of the components of the equipment 138, 140 are not always in use at the same time even if the aerial vehicle 102 is operating in the normal operating mode. Thus, while the normal operating mode allows all components of the equipment 138, 140 to operate at full capacity, some of the components may remain in a power-saving state until they are needed. For example, the ACS may only be turned on when its use is needed, and may otherwise remain in a power-saving state. If the aerial vehicle 102 is not presently operating in the normal operating mode, the computing devices 104 may further generate a power command instructing the aerial vehicle 102 to switch to the normal operating mode. Thereafter, at block 416, the computing devices 104 may transmit the power command to the aerial vehicle 102 via the communication link 108.

Figure 4B:
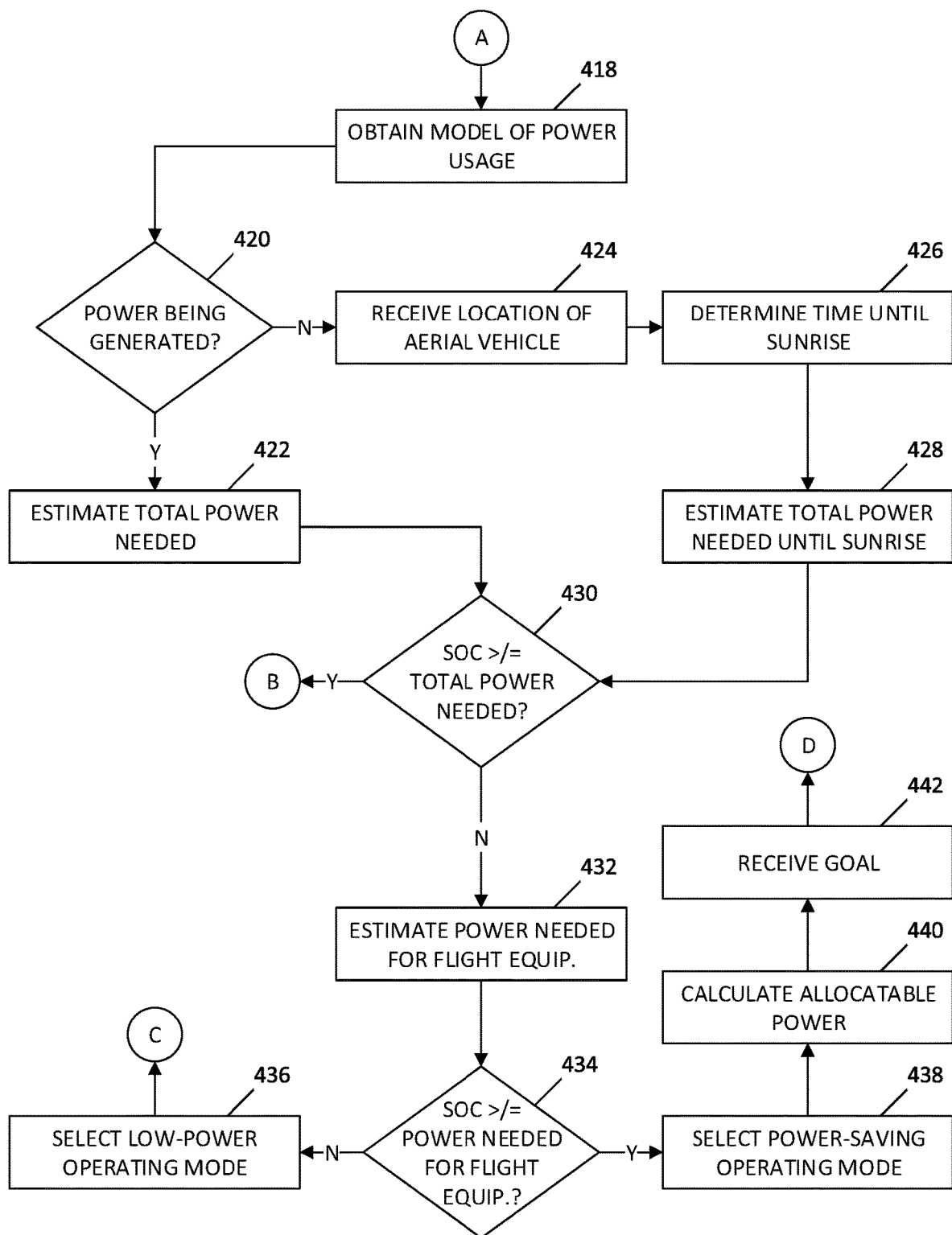

Turning now to FIG. 4B, at block 418, the computing devices 104 obtain one or more simulation models of power usage. In some embodiments, the simulation models are previously and/or continuously generated as data is received from the aerial vehicle 102 and/or any other data source. One or more additional simulation models may also be generated at block 418. The simulation models of power usage may be generated based on the data regarding the current rate of power consumption received at block 410. The simulation models of power usage may simulate the individual and/or total expected power requirements of the various components over a predetermined and/or particular period of time and under various variable conditions, such as if the ACS is activated for a particular amount of time or at a particular operating capacity. For example, a simulation model may be generated to determine how much power would be consumed by the ACS if the ACS is activated at 50% operating capacity, which would consume less power but also reduce efficiency, and thus take longer to perform a particular function. Similarly, the service equipment may be activated at less than full capacity. For example, the LTE system may be activated to provide service to 50% of its service sectors, and thus reduce the amount of power consumed by the LTE system. The simulation models of power usage may further simulate the effects on power consumption if one or more of the components are switched to a power-saving state. For example, switching one or more components to a power-saving state may reduce the power consumption of those components switched to the power-saving state, but may also affect the power consumption, either lower or higher, of other components that are related to and/or interact with the components that are switched to the power-saving state. Thus, the simulation models of power usage may show the effects on power consumption of the interplay between various components of the equipment 138, 140 under various variable conditions. The generation of simulation models of power usage is further described below with reference to FIG. 5.

Next, at block 420, the computing devices 104 determine whether power is currently being generated or not being generated by the power generation module 134. In embodiments, the computing devices 104 receive data regarding a current state of power generation from the aerial vehicle 102, such as by way of the transceiver 132. The present state of power generation refers to whether or not the power generation module 134 is currently generating power. The power generation module 134 is typically able to generate power during the daytime, i.e. from sunrise until sunset, but, due to weather and/or hardware conditions, the power generating ability of the power generation module 134 may be affected. In some embodiments, the various components of the equipment 138, 140 coupled to the aerial vehicle 102 that are in use at any particular time may be selected such that the power generation module 134, when operating, is able to generate sufficient power to satisfy the expected power requirements of all the components of the equipment 138, 140, and further to generate sufficient excess power to replenish the stored power in the power storage module 124. In other embodiments, the various components of the equipment 138, 140 coupled to the aerial vehicle 102, if concurrently activated, may consume as much or more power than the power generation module 134 is able to generate over a given time period, and thus power consumption may need to be limited during the daytime to ensure that sufficient power is stored in the power storage module 124 for use during the nighttime. For example, there may be particular components of the equipment 138, 140, such as the ACS, that, if operated constantly, may consume more power than the power generation module 134 is able to generate, and thus power provision to such components may need to be restricted. As such, it is contemplated that there may be situations where the amount of power being consumed is greater than the amount of power being generated at a particular time, and in such situations, power stored in the power storage module 124 may be used to supplement the power generated by the power generation module 134 even during the daytime. The state of power generation may be intermittently or continuously transmitted to the computing devices 104 during regular communications between the aerial vehicle 102 and the computing devices 104. If the computing devices 104 determine that power is currently being generated ("Y" at block 420), processing proceeds to block 422. Alternatively, if the computing devices 104 determine that power is not currently being generated ("N" at block 420), processing proceeds to block 424.

At block 422, the computing devices 104 estimate an expected amount of power needed to provide power to the components of the equipment 138, 140 coupled to the aerial vehicle 102 for a particular period of time. The expected amount of power needed may include a total amount of power needed by all of the components and/or individual amounts of power needed for each component for the particular period of time. In embodiments, the particular period of time may be a predetermined amount of time, a dynamically determined amount of time, an amount of time remaining until the occurrence of an event (e.g. sunrise, sunset, start of a service period, end of a service period, arriving at a particular location, etc.), and/or a user-specified amount of time. The estimation of the expected amount of power needed may be based on the current rate of power consumption received at block 410. The estimation of the expected amount of power needed may further be based on the one or more simulation models of power usage obtained at block 418. Thereafter, processing proceeds to block 430.

At block 424, the computing devices 104 receive data indicating a location of the aerial vehicle 102. The location of the aerial vehicle 102 may be determined by or based on data received from the sensors 128, and may be transmitted to the computing devices 104 via the communication link 108. Thereafter, at block 426, the computing devices 104 determine an expected time until sunrise based on the location of the aerial vehicle 102 and the expected time of sunrise at the location of the aerial vehicle 102. Then, at block 428, the computing devices 104 estimate an expected amount of power needed until sunrise to provide power to the components of the equipment 138, 140 coupled to the aerial vehicle 102. The expected amount of power needed until sunrise may include a total amount of power needed until sunrise by all of the components and/or individual amounts of power needed for each component. The estimation of the expected amount of power needed until sunrise may be based on the current rate of power consumption received at block 410 and the time until sunrise determined at block 426. The estimation of the expected amount of power needed until sunrise may further be based on the one or more simulation models of power usage obtained at block 418.

Thereafter, at block 430, the computing devices 104 determine whether the SOC of the power storage module 124 received at block 402 is greater than or equal to the total amount of power needed as estimated at blocks 422 or 428. If the computing devices 104 determine that the SOC of the power storage module 124 is greater than or equal to the estimated total amount of power needed ("Y" at block 430), processing returns to block 414. Alternatively, if the computing devices 104 determine that the SOC of the power storage module 124 is not greater than or equal to the estimated total amount of power needed, and thus the SOC of the power storage module 124 is insufficient to provide power to all of the components of the equipment 138, 140 ("N" at block 430), processing proceeds to block 432.

At block 432, the computing devices 104 estimate an expected amount of power needed until sunrise to provide power to only the components of the flight-related equipment 138. The estimation of the expected amount of power needed until sunrise to provide power to only the components of the flight-related equipment 138 may be based on the current rate of power consumption of each component of the flight-related equipment 138, as received at block 410, and the time until sunrise determined at block 426, and the estimation may further be based on the one or more simulation models of power usage obtained at block 418.

Thereafter, at block 434, the computing devices 104 determine whether the SOC of the power storage module 124 received at block 402 is greater than or equal to the expected amount of power needed to provide power to only the components of the flight-related equipment 138, as estimated at block 432. If the computing devices 104 determine that the SOC of the power storage module 124 is not greater than or equal to the expected amount of power needed to provide power to the components of the flight-related equipment 138, and thus the SOC of the power storage module 124 is insufficient to provide power to all the components of the flight-related equipment 138 ("N" at block 434), processing proceeds to block 436. Alternatively, if the computing devices 104 determine that the SOC of the power storage module 124 is greater than or equal to the expected amount of power needed to provide power to the components of the flight-related equipment 138 ("Y" at block 434), processing proceeds to block 438.

At block 436, the computing devices 104 select a low-power operating mode for the aerial vehicle 102. The low-power operating mode requires all components of the other equipment 140 coupled to the aerial vehicle 102 to be switched to a power-saving state or a power-off state and prevents the power plant 122 from providing power to any components of the other equipment 140. Additionally, one or more components of the flight-related equipment may also be switched to a power-saving state based on the processes of blocks 456 to 462, described below. If the aerial vehicle 102 is not presently operating in the low-power operating mode, the computing devices 104 may further generate a power command instructing the aerial vehicle 102 to switch to the low-power operating mode and transmit the power command to the aerial vehicle 102 via the communication link 108. Thereafter, processing proceeds to block 456.

At block 438, the computing devices 104 select a power-saving operating mode for the aerial vehicle 102. The power-saving operating mode allows all components of the flight-related equipment 138 coupled to the aerial vehicle 102 to operate normally and allows the power plant 122 to provide power to all the components of the flight-related equipment 138. Additionally, one or more components of the other equipment 140 may be switched to a power-saving state based on the processes of blocks 444 to 454, described below. If the aerial vehicle 102 is not presently operating in the power-saving operating mode, the computing devices 104 may further generate a power command instructing the aerial vehicle 102 to switch to the power-saving operating mode and transmit the power command to the aerial vehicle 102 via the communication link 108. Thereafter, processing proceeds to block 440.

At block 440, the computing devices 104 calculate an amount of allocable power. The amount of allocable power corresponds to a difference between the SOC of the power storage module 124 and the expected amount of power needed until sunrise to provide power to the components of the flight-related equipment 138, as estimated at block 432. In some embodiments, additional amounts of power may be held in reserve beyond the expected amount of power needed until sunrise to provide power to the components of the flight-related equipment 138, and thus the amount of allocable power calculated at block 440 may not be the exact difference between the SOC of the power storage module 124 and the expected amount of power needed until sunrise to provide power to the components of the flight-related equipment 138. Thereafter, processing proceeds to block 442.

At block 442, the computing devices 104 receive a goal. As noted above, the goal may include one or more general goals and/or one or more specific goals. While FIG. 4B shows the goal as being received after block 440, those skilled in the art will recognize that the goal may be received and/or updated at any point during the execution of the method 400.

Figure 4C:
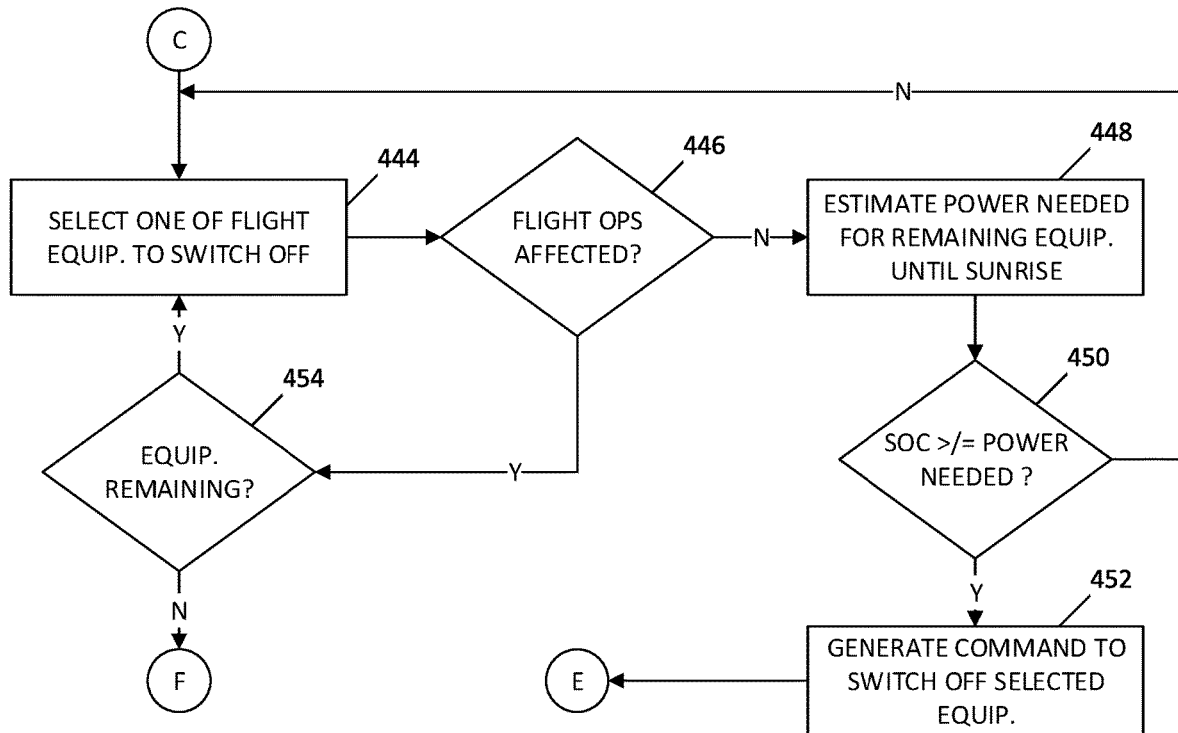

Turning now to FIG. 4C, at block 444, the computing devices 104 selects one of the components of the flight-related equipment 138 to be switched to a power-saving state. Based on the determination of block 434, it has been determined that the SOC of the power storage module 124 is insufficient to provide power to all of the components of the flight-related equipment until sunrise. As such, it is now determined whether power consumption can be reduced by switching one or more components of the flight-related equipment 138 to a power-saving state without affecting flight operations. The computing devices 104 may select one of the components of the flight-related equipment 138 to switch to a power-saving state based on a predetermined list of components that may be switched to the power-saving state under these conditions, based on a determination of which components of the flight-related equipment 138 are consuming the most power, and/or based on the interplay between the components of the flight-related equipment 138.

Thereafter, at block 446, the computing devices 104 determine whether flight operations are affected by switching the selected component of the flight-related equipment 138 to a power-saving state. If the computing devices 104 determine that flight operations will not be affected by switching the selected component of the flight-related equipment 138 to a power-saving state ("N" at block 446), processing proceeds to block 448. Alternatively, if the computing devices 104 determine that flight operations will be affected by switching the selected component of the flight-related equipment 138 to a power-saving state ("Y" at block 446), the component selected at block 444 is deselected and processing proceeds to block 454.

At block 448, the computing devices 104 estimate an expected amount of power needed to provide power until sunrise to the components of the flight-related equipment 138 that remain switched on. Then, at block 450, the computing devices 104 determine whether the SOC of the power storage module 124 received at block 402 is greater than or equal to the expected amount of power needed until sunrise as estimated at block 448. If the computing devices 104 determine that the SOC of the power storage module 124 is not greater than or equal to the expected amount of power needed as estimated at block 448, and thus the SOC of the power storage module 124 is insufficient to provide the expected amount of power needed as estimated at block 448 ("N" at block 450), processing returns to block 444 where another component of the flight-related equipment 138 is selected. Alternatively, if the computing devices 104 determine that the SOC of the power storage module 124 is greater than or equal to the expected amount of power needed as estimated at block 448 ("Y" at block 450), processing proceeds to block 450.

At block 450, the computing devices 104 generate a power command to switch the components of the flight-related equipment 138 selected at block 444 to a power-saving state. Thereafter, processing returns to block 416 where the power command is transmitted to the aerial vehicle.

At block 454, the computing devices 104 determine whether there are other flight-related components of the flight-related equipment 138 remaining that have not previously been selected. If the computing devices 104 determine that there are other components of the flight-related equipment 138 remaining that have not previously been selected, processing returns to block 444, where another component of the flight-related equipment 138 is selected. Alternatively, if the computing devices 104 determine that there are no other components of the flight-related equipment 138 remaining that have not previously been selected, processing returns to block 408.

Figure 4D:
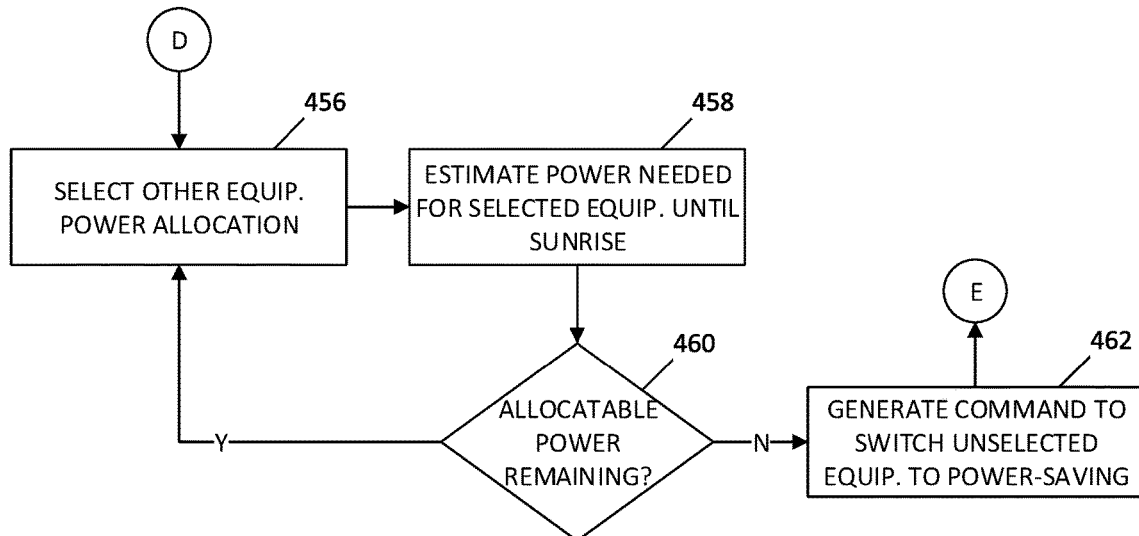

The process of generating a power allocation plan or budget will now be described with reference to FIG. 4D. As noted above, the power allocation plan may be based on various goals, such as the goal received at block 442, and/or the amount of allocable power as determined at block 440. In particular, the power allocation plan seeks to maximize the use of available power such that all allocable power is allocated for use by the components of the other equipment 140. Based on the determination at block 434, it has been determined that the SOC of the power storage module 124 is sufficient to provide power to all of the components of the flight-related equipment until sunrise. As such, there is excess power remaining beyond what is necessary for flight operations, and it is now determined how that excess (and thus allocable) power should be allocated to the components of the other equipment 140.

At block 456, the computing devices 104 selects one or more of the components of the other equipment 140 to which power should be allocated. The computing devices 104 may select one of the components of the other equipment 140 for power allocation based on the goal received at block 442, based on a predetermined list of components that should be switched on or switched to a power-saving state under these conditions, based on the data regarding the present rate of power consumption received at block 410, and/or based on the interplay between the components of the other equipment 140 as modeled in the simulation models obtained at block 418. For example, the various components of the other equipment 140 may have different functions and/or different rates of power consumption, and the determination of which components to select for power allocation may be based on the functions and/or rates of power consumption of the various components of the other equipment 140.

Thereafter, at block 458, the computing devices 104 estimate an expected amount of power needed to provide power until sunrise to the components of the other equipment 140 selected at block 456. The estimation of the expected amount of power needed to provide power until sunrise to the components of the other equipment 140 selected at block 456 may be determined by adding together the amount of power required to provide power until sunrise to the components of the other equipment 140 selected at block 456, and/or by subtracting the amount of power required to provide power until sunrise to one or more components of the other equipment 140 that were not selected at block 456. In some embodiments, the estimation of the expected amount of power needed to provide power until sunrise to the components of the other equipment 140 selected at block 456 is based on the simulation models of power usage obtained at block 418.

Then, at block 460, the computing devices 104 determine whether there is additional allocable power remaining. For example, the computing devices 104 may determine whether the amount of allocable power calculated at block 440 is greater than the amount of power required to provide power until morning to the components of the other equipment 140 selected at block 456, as estimated at block 458. If the computing devices 104 determine that there is additional allocable power remaining ("Y" at block 460), processing returns to block 456 where another component of the other equipment 140 is selected. Alternatively, if the computing devices 104 determine that all allocable power has been allocated ("N" at block 460), processing proceeds to block 462.

At block 462, the computing devices 104 generate a power command to switch the components of the other equipment 140 that were not selected at block 456 to a power-saving state. Thereafter, processing returns to block 416 where the power command is transmitted to the aerial vehicle.

Figure 5:
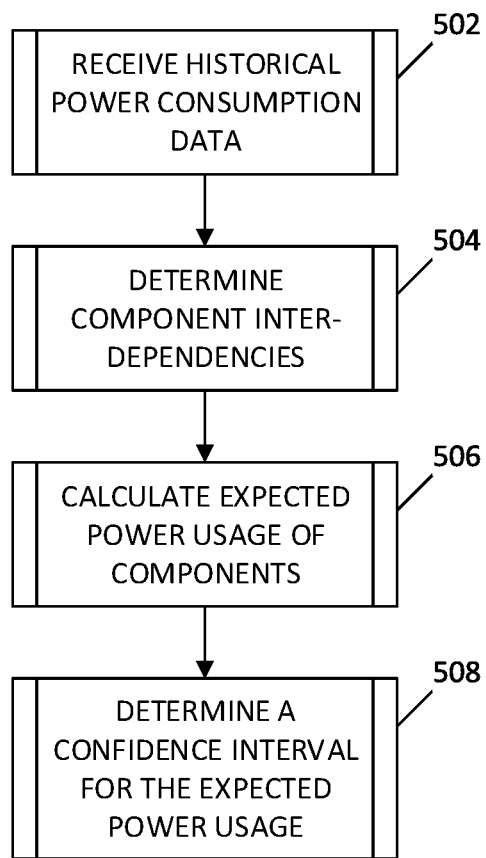
FIG. 5 is a flowchart showing an illustrative method for generating models of power consumption of components of an aerial vehicle, in accordance with an embodiment of the present disclosure.

With reference to FIG. 5, there is shown a flowchart of an illustrative method 500 for generating one or more simulation models of power usage of one or more components of an aerial vehicle. The simulation models, in some examples, are executable to forecast power usage of one or more components of the aerial vehicle. In some embodiments, the method 500 may be performed during or in conjunction with performance of block 418 of FIG. 4B. Starting at block 502, computing devices 104 may receive and/or retrieve from storage historical power consumption data. The historical power consumption data may include power consumption rates of the components of the equipment 138, 140 coupled to the aerial vehicle 102 during previous days of the present flight of the aerial vehicle 102, previous flights of the aerial vehicle 102, and/or other aerial vehicles 102 with similar components and/or flights. The historical power consumption data may also reflect power consumption rates of components of the equipment 138, 140 at particular locations, during particular seasons, and/or under particular weather conditions. Although not shown in FIG. 5, in some embodiments, instead of or in addition to historical power consumption, present power consumption data is received, retrieved, and/or utilized at various points throughout the method 500.

Thereafter, at block 504, the computing devices 104 determine relationships and/or inter-dependencies of the various components of the equipment 138, 140. For example, various components may be related to and/or dependent on other components, and if one such component is switched to a power-saving state, the related or dependent components may lose functionality (and thus consume less power) or increase functionality to compensate for the component that is switched to a power-saving state, and thus consume more power. The relationships and/or inter-dependencies of the various components of the equipment 138, 140 may be determined based on information regarding the various components stored in the computing devices 104 and/or received from the data sources 106, such as a map indicating of a power-based hierarchy of components of the aerial vehicle 102.

Next, at block 506, the computing devices 104 calculate expected power consumption rates of the various components of the equipment 138, 140, based on the present power consumption data received at block 410 and/or the historical power consumption data received at block 502, and the inter-dependencies of the various components determined at block 504. In some embodiments, the calculation of the expected power consumption rates of the various components may further be based on the goal (or goal data) received at block 442, the state of charge of the power storage module 124 received at block 402, flight information, such as, for example, flight path data, and/or weather information received from the data sources 106, and/or a rate of power generation of the power generation module 134. Additionally, as noted above, various simulations may be performed, and thus various simulation models generated, based on a variety of parameters affecting the flights, and thus the power consumption rates of particular components, of aerial vehicle 102. Further, in some aspects, using Monte Carlo methods, various simulations may be performed multiple times using one or more simulation modules, including relying on repeated random sampling to obtain simulation results that include a probability distribution.

Thereafter, at block 508, a confidence interval is determined regarding the expected accuracy of each of the one or more simulation models generated. The confidence interval may be based on how closely historical power consumption data reflect the present power consumption data and the parameters of the present flight and equipment makeup of aerial vehicle 102. The confidence interval may further be based on a probability distribution included as a result of performing multiples simulations. The computing device 104 may generate a power budget by utilizing, autonomously and/or with the input of a flight engineer, the confidence interval and/or the output simulations performed based on one or more simulation models.

Among the benefits of the above-described method 500 of FIG. 5 are the ability to generate multiple simulation models, based on various parameters, in order to simulate various potential outcomes. For example, various simulation models may be generated based on the present and historical performance and/or efficiency of particular components and combinations of components coupled to the aerial vehicle 102. The simulation models may further account for expected variables, such as expected efficiency of power generation by the power generation module 134, expected power needs of the components based on weather information and/or flight information, etc. The simulation models my thus be used to predict the performance and efficiency of the particular combination of components coupled to the aerial vehicle 102 to calculate an expected amount of power required to provide power to the components over a particular period of time.

Figure 6:
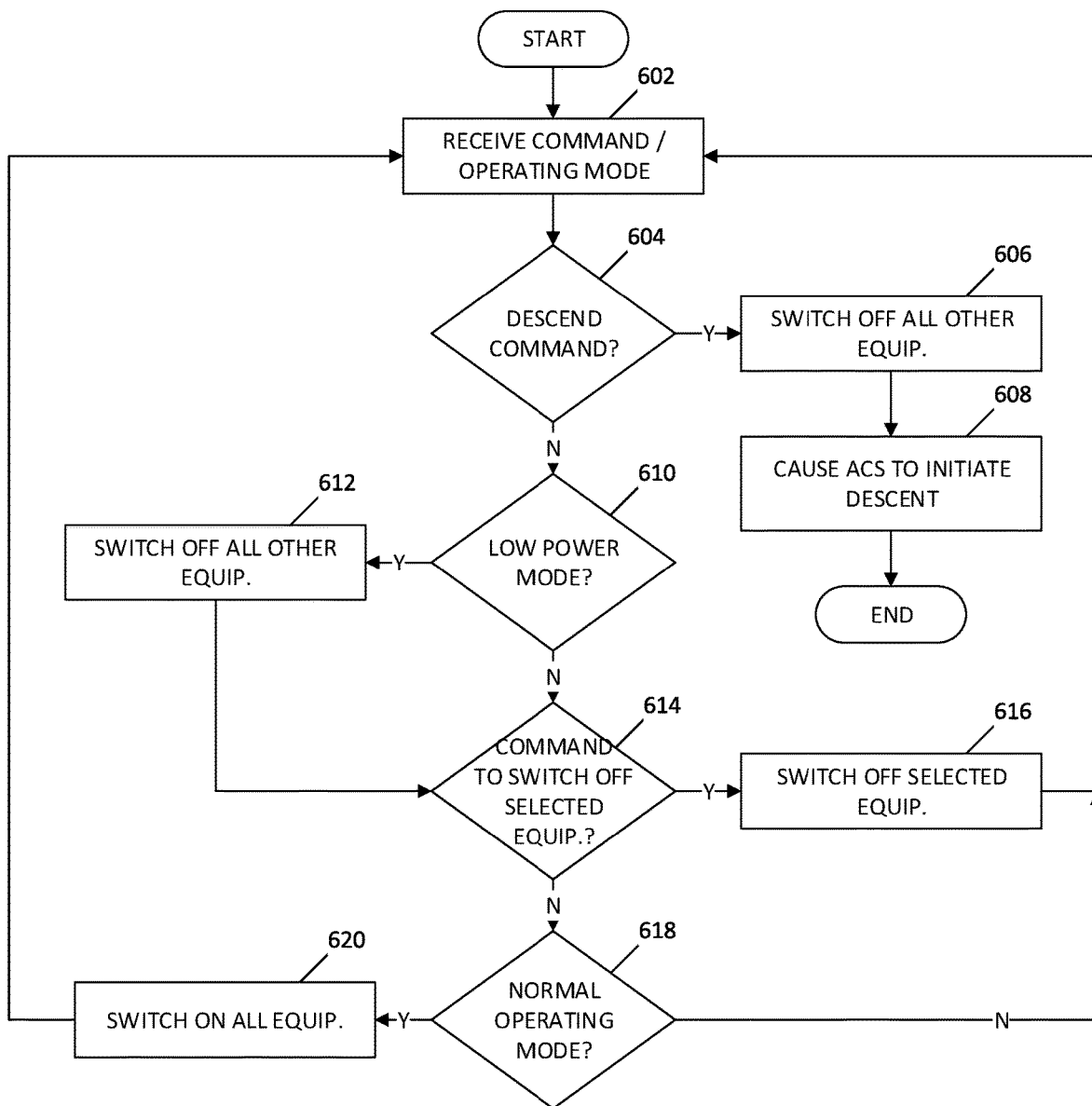
FIG. 6 is a flowchart showing an illustrative method for managing power of an aerial vehicle from the perspective of the aerial vehicle of FIG. 1, in accordance with an embodiment of the present disclosure.

FIG. 6 is a flowchart showing an illustrative method 600 for managing power of an aerial vehicle, from the perspective of the aerial vehicle 102, in accordance with an embodiment of the present disclosure. As described above with reference to FIGS. 4A-4D, those skilled in the art will recognize that the processes described below may be a sub-process forming part of a bigger process for controlling aerial vehicles, and thus various other processes and steps may be performed in addition to the below-described steps and processes. While the processes described below are organized into an illustrative ordered sequence of steps, those skilled in the art will appreciate that various of these steps may be performed in a different order or sequence, repeated, and/or omitted without departing from the scope of the present disclosure.

At block 602, the aerial vehicle 102 receives, by way of the wireless communication link 108 and the transceiver 132, a command from the computing device 104. The aerial vehicle 102 periodically receives multiple transmissions of commands from the computing device 104, as described above.

At block 604, it is determined whether the command received at block 602 is a command to descend. If it is determined that the command received at block 602 is a descend command ("Y" at block 604), processing proceeds to block 606. Alternatively, if it is determined that the command received at block 602 is not a descend command ("N" at block 604), processing proceeds to block 610.

At block 606, all components of the other equipment 140 coupled to the aerial vehicle are switched off. Thereafter, at block 608, a command is provided to the ACS to initiate a descent to the ground, whereafter processing of method 600 ends. Those skilled in the art will appreciate that additional procedures may be performed during a descent to the ground, but those procedures are omitted here as beyond the scope of the present disclosure.

At block 610, it is determined whether the command received at block 602 is a power command to enter low-power mode. If it is determined that the command received at block 602 is a power command to enter low-power mode ("Y" at block 610), processing proceeds to block 612, where all components of the other equipment 140 are switched to a power-saving state. Thereafter, or if it is determined that the command received at block 602 is not a power command to enter low-power mode ("N" at block 610), processing proceeds to block 614.

At block 614, it is determined whether the command received at block 602 is a power command to switch one or more particular components to a power-saving state. If it is determined that the command received at block 602 is a power command to switch one or more particular components to a power-saving state ("Y" at block 614), processing proceeds to block 616, where the components indicated in the power command received at block 602 are switched to a power-saving state. Thereafter, processing returns to block 602. Alternatively, if it is determined that the command received at block 602 is not a power command to switch one or more particular components to a power-saving state ("N" at block 614), processing proceeds to block 618.

At block 618, it is determined whether the command received at block 602 is a power command to enter a normal operating mode. If it is determined that the command received at block 602 is a power command to enter a normal operating mode ("Y" at block 618), processing proceeds to block 620, where all components are switched on and an instruction is provided to the power plant 122 to provide power to all components of the equipment 138, 140 coupled to the aerial vehicle 102, whereafter processing returns to block 602. Alternatively, if it is determined that the command received at block 602 is not a power command to enter a normal operating mode ("N" at block 618), processing returns to block 602.

As can be appreciated in view of the present disclosure, the systems and methods described herein provide advancements in aerial vehicle power management that enable aerial vehicles to be more efficient in their power allocation and usage, thereby increasing their effectiveness and reducing power that goes unused and thus wasted. The embodiments disclosed herein are examples of the present systems and methods and may be embodied in various forms. For instance, although certain embodiments herein are described as separate embodiments, each of the embodiments herein may be combined with one or more of the other embodiments herein. Specific structural and functional details disclosed herein are not to be interpreted as limiting, but as a basis for the claims and as a representative basis for teaching one skilled in the art to variously employ the present information systems in virtually any appropriately detailed structure. Like reference numerals may refer to similar or identical elements throughout the description of the figures.

The phrases "in an embodiment," "in embodiments," "in some embodiments," or "in other embodiments" may each refer to one or more of the same or different embodiments in accordance with the present disclosure. A phrase in the form "A or B" means "(A), (B), or (A and B)." A phrase in the form "at least one of A, B, or C" means "(A); (B); (C); (A and B); (A and C); (B and C); or (A, B, and C)."

The systems and/or methods described herein may utilize one or more controllers to receive various information and transform the received information to generate an output. The controller may include any type of computing device, computational circuit, or any type of processor or processing circuit capable of executing a series of instructions that are stored in a memory. The controller may include multiple processors and/or multicore central processing units (CPUs) and may include any type of processor, such as a microprocessor, digital signal processor, microcontroller, programmable logic device (PLD), field programmable gate array (FPGA), or the like. The controller may also include a memory to store data and/or instructions that, when executed by the one or more processors, causes the one or more processors to perform one or more methods and/or algorithms. In example embodiments that employ a combination of multiple controllers and/or multiple memories, each function of the systems and/or methods described herein can be allocated to and executed by any combination of the controllers and memories.

Any of the herein described methods, programs, algorithms or codes may be converted to, or expressed in, a programming language or computer program. The terms "programming language" and "computer program," as used herein, each include any language used to specify instructions to a computer, and include (but is not limited to) the following languages and their derivatives: Assembler, Basic, Batch files, BCPL, C, C+, C++, Delphi, Fortran, Java, JavaScript, machine code, operating system command languages, Pascal, Perl, PL1, scripting languages, Visual Basic, metalanguages which themselves specify programs, and all first, second, third, fourth, fifth, or further generation computer languages. Also included are database and other data schemas, and any other meta-languages. No distinction is made between languages which are interpreted, compiled, or use both compiled and interpreted approaches. No distinction is made between compiled and source versions of a program. Thus, reference to a program, where the programming language could exist in more than one state (such as source, compiled, object, or linked) is a reference to any and all such states. Reference to a program may encompass the actual instructions and/or the intent of those instructions.

Any of the herein described methods, programs, algorithms or codes may be contained on one or more non-transitory computer-readable or machine-readable media or memory. The term "memory" may include a mechanism that provides (in an example, stores and/or transmits) information in a form readable by a machine such a processor, computer, or a digital processing device. For example, a memory may include a read only memory (ROM), random access memory (RAM), magnetic disk storage media, optical storage media, flash memory devices, or any other volatile or non-volatile memory storage device. Code or instructions contained thereon can be represented by carrier wave signals, infrared signals, digital signals, and by other like signals.

The foregoing description is only illustrative of the present systems and methods. Various alternatives and modifications can be devised by those skilled in the art without departing from the disclosure. Accordingly, the present disclosure is intended to embrace all such alternatives, modifications and variances. The embodiments described with reference to the attached drawing figures are presented only to demonstrate certain examples of the disclosure. Other elements, steps, methods, and techniques that are insubstantially different from those described above and/or in the appended claims are also intended to be within the scope of the disclosure.

What is claimed is:

1. A system for managing power of an aerial vehicle, the system comprising:
    an aerial vehicle including:
        a power storage module, and
        a plurality of components; and
    a computing device communicatively coupled to the aerial vehicle, the computing device including a processor and a memory storing instructions which, when executed by the processor, cause the computing device to:
        receive data indicating a state of charge of the power storage module,
        receive data indicating a rate of power consumption of the plurality of components,
        receive a goal,
        generate a power command based on at least one of the state of charge of the power storage module, the rate of power consumption of the plurality of components, or the goal, and
        transmit the power command to the aerial vehicle.

2. The system according to claim 1, wherein the instructions, when executed by the processor, further cause the computing device to:
    determine an expected amount of power required to satisfy the goal,
    wherein the generation of the power command is further based on the determined amount of power required to satisfy the goal.

3. The system according to claim 2, wherein the determination of the expected amount of power required to satisfy the goal is based at least in part on the data indicating the rate of power consumption of the plurality of components.

4. The system according to claim 2, wherein the plurality of components includes at least one flight-related component and at least one non-flight-related component, and
    wherein the instructions, when executed by the processor, further cause the computing device to:
        receive location data indicating a location of the aerial vehicle;
        determine a time until sunrise based on the location data, sunrise comprising another time provided by sunrise data; and
        determine, based on the data indicating the current rate of power consumption of the plurality of components, an expected amount of power required to provide power to the at least one flight-related component until sunrise.

5. The system according to claim 4, wherein the instructions, when executed by the processor, further cause the computing device to determine, based on the data indicating the state of charge of the power storage module and the expected amount of power required to provide power to the at least one flight-related component until sunrise, that the state of charge of the power storage module is greater than the expected amount of power required to provide power to the at least one flight-related component until sunrise.

6. The system according to claim 5, wherein the instructions, when executed by the processor, further cause the computing device to determine an expected amount of allocable power, the expected amount of allocable power corresponding to a difference between the state of charge of the power storage module and the expected amount of power required to provide power to the at least one component until sunrise.

7. The system according to claim 6, wherein the instructions, when executed by the processor, further cause the computing device to generate a power allocation plan based on the expected amount of allocable power and the goal.

8. The system according to claim 7, wherein the power allocation allocates all of the allocable power to the at least one non-flight-related component based on the goal.

9. The system according to claim 1, wherein the instructions, when executed by the processor, further causes the computing device to generate a power allocation plan based on the goal.

10. The system according to claim 9, wherein the generation of the power command is further based on the power allocation plan.

11. The system according to claim 9, wherein the power allocation plan includes a plurality of power commands to switch particular components of the plurality of components to a power-saving state.

12. The system according to claim 11, wherein the plurality of power commands included in the power allocation plan are transmitted to the aerial vehicle at particular times.

13. The system according to claim 11, wherein the plurality of power commands included in the power allocation plan are transmitted to the aerial vehicle based on the state of charge of the power storage module.

14. The system according to claim 9, wherein the plurality of components includes at least one flight-related component and at least one non-flight-related component, and wherein the power allocation plan includes at least one command to switch the at least one non-flight-related component to a power-saving state.

15. The system according to claim 1, wherein the instructions, when executed by the processor, further cause the computing device to generate at least one simulation model of power consumption of the plurality of components based on the data indicating the rate of power consumption of the plurality of components.

16. The system according to claim 15, wherein the generation of the power command is further based on the at least one simulation model.

17. The system according to claim 15, wherein the instructions, when executed by the processor, further cause the computing device to generate a power allocation plan based on the goal and the simulation model.

18. The system according to claim 9, wherein the power allocation plan includes a command to switch at least one of the plurality of components to a power-saving state.

19. A method for managing power of an aerial vehicle, the method comprising:
receiving data indicating a state of charge of a power storage module of the aerial vehicle;
receiving data indicating a rate of power consumption of a plurality of components of the aerial vehicle;
receiving a goal;
generating, based on at least one of the state of charge of the power storage module, the rate of power consumption of the plurality of components, and the goal, a power command; and
transmitting the power command to the aerial vehicle.

20. A non-transitory computer-readable storage medium storing instructions which, when executed by a processor, cause a computing device to:
receive data indicating a state of charge of a power storage module of an aerial vehicle;
receive data indicating a rate of power consumption of at least one component of the aerial vehicle;
receive a goal;
generate, based on at least one of the state of charge of the power storage module, the rate of power consumption of the plurality of components, and the goal, a power command; and
transmit the power command to the aerial vehicle.

* * * * *